(12) United States Patent
Mons et al.

(10) Patent No.: US 7,695,248 B2
(45) Date of Patent: *Apr. 13, 2010

(54) METHOD OF MAKING A RIM SITUATED AT THE FREE END OF A BLADE, A BLADE OBTAINED BY THE METHOD, AND A TURBOMACHINE FITTED WITH THE BLADE

(75) Inventors: Claude Marcel Mons, Savigny le Temple (FR); Joël Olivier Alfred Abel Vigneau, Champcueil (FR)

(73) Assignee: SNECMA, Paris (FR)

( * ) Notice: Subject to any disclaimer, the term of this patent is extended or adjusted under 35 U.S.C. 154(b) by 664 days.

This patent is subject to a terminal disclaimer.

(21) Appl. No.: 11/560,172

(22) Filed: Nov. 15, 2006

(65) Prior Publication Data
US 2007/0134096 A1  Jun. 14, 2007

(30) Foreign Application Priority Data
Nov. 15, 2005  (FR) .................................. 05 11578

(51) Int. Cl.
*F01D 5/18*  (2006.01)
*F01D 5/28*  (2006.01)
(52) U.S. Cl. ............. 416/97 R; 416/241 R; 219/121.64
(58) Field of Classification Search .............. 415/173.6; 416/241 R, 97 R; 219/121.6, 121.64
See application file for complete search history.

(56) References Cited

U.S. PATENT DOCUMENTS

| 4,390,320 A | * | 6/1983 | Eiswerth .................... 416/97 R |
| 4,884,820 A | * | 12/1989 | Jackson et al. ............... 277/415 |
| 5,038,014 A | | 8/1991 | Pratt et al. |
| 5,160,822 A | | 11/1992 | Aleshin |
| 5,453,329 A | * | 9/1995 | Everett et al. ................ 428/565 |

(Continued)

FOREIGN PATENT DOCUMENTS

DE  10 2004 001 722 A1  8/2005

(Continued)

OTHER PUBLICATIONS

U.S. Appl. No. 11/560,131, filed Nov. 15, 2006, Mons, et al.

(Continued)

*Primary Examiner*—Ninh H Nguyen
(74) *Attorney, Agent, or Firm*—Oblon, Spivak, McClelland, Maier & Neustadt, L.L.P.

(57) ABSTRACT

According to the method, a blade is provided having at least one base for a rim at its free end, and the projecting portion of the rim is built up by depositing successive layers on the base by performing the following steps:
- activating a laser source connected to an optical head focused on a point of the surface of the top of the base and activating a powder source connected to a spray nozzle, whereby a localized melt is formed at said point, into which the powder is injected, thereby forming a localized region of extra thickness; and
- aiming the optical head and the nozzle on another point adjacent to said region of extra thickness and returning to the preceding step until a layer has been formed over substantially the entire base.

20 Claims, 8 Drawing Sheets

U.S. PATENT DOCUMENTS

| | | | |
|---|---|---|---|
| 5,900,170 A * | 5/1999 | Marcin et al. | 219/121.66 |
| 6,939,104 B2 * | 9/2005 | Chantal et al. | 415/173.1 |
| 2001/0008230 A1 | 7/2001 | Keicher et al. | |

FOREIGN PATENT DOCUMENTS

| | | |
|---|---|---|
| DE | 10 2004 002 551 A1 | 8/2005 |

OTHER PUBLICATIONS

U.S. Appl. No. 11/560,034, filed Nov. 15, 2006, Mons, et al.

U.S. Appl. No. 11/560,100, filed Nov. 15, 2006, Mons, et al.

* cited by examiner

METHOD OF MAKING A RIM SITUATED AT THE FREE END OF A BLADE, A BLADE OBTAINED BY THE METHOD, AND A TURBOMACHINE FITTED WITH THE BLADE

The invention relates to a method of making at least one rim situated at the free end of a blade, to a blade obtained by the method, and to a turbomachine fitted with such a blade.

The present invention relates equally well to blades of a first type in which the free end is provided with one or more rims, in general two mutually-parallel rims, each forming a wiper, and to blades of a second type that are hollow and that are provided at their free ends with an open cavity or "bathtub" bordered by the rim.

BACKGROUND OF THE INVENTION

By way of illustration, document WO 02/097241 illustrates a blade of the first type and document FR 2 858 650 illustrates a blade of the second type.

The function of such rims is to limit the areas facing each other between the free end of the blade and the corresponding annular surface of the turbine or compressor casing so as to protect the body of the blade against damage that might be caused by coming into contact with an annular segment, while nevertheless providing sealing between the rotor and the stator.

This function of sealing the ends of blades is most important since it determines the performance of the turbomachine, concerning efficiency, both in a turbine stage and in a compressor stage having moving blades. Depending on the operating conditions of the turbomachine, various instability phenomena exist that have the effect of reducing the efficiency of a turbomachine and/or leading to mechanical or thermal overloads on the blades.

In addition, there is clearance between the tops of the blades and the stator. In operation, this situation leads overall to friction appearing between the blades and the stator which can lead to damage to the ends of the blade and/or to the surface of the stator, or to possible variation in the above-mentioned clearance. In addition, the rotor and the stator that is concentric thereabout are of shapes that are not strictly perfectly circular, and variations in differential thermal expansion as well as mechanical deformations resulting from the stresses acting thereon change the dimensions of such parts.

In order to reduce such friction while guaranteeing the necessary sealing, it is the practice to use sealing linings suitable for being worn away, which linings are constituted by rings of "abradable" materials placed on the inside surfaces of the stator where they face moving blades. This means that the sealing linings of the stator become worn or abraded as the blades move past them so as to become matched to the shapes of the blades. Under such circumstances, the blades are provided with rims forming wipers on their radially-outer peripheries, for the purpose of co-operating with abradable linings, said rims themselves presenting a variety of streamlined shapes and being made of abrasive material.

For blades of the second type, the rim is not in the form of a plurality of wipers, but in the form of a generally continuous rim defining an open cavity at the free end of the blade, but said rim nevertheless performs the same function.

Such rims are usually made by being cast simultaneously with the remainder of the blade, after which they are finished by machining in order to give them their final shape.

In addition, in order to avoid damage to or even destruction of such rims, particularly when they are located in a high pressure compressor or turbine, they can be coated by thermal spraying (plasma torch, high velocity oxyfuel (HVOF), . . . ) an abrasive deposit e.g. of the alumina and titanium dioxide or carbide type, e.g. on an underlayer of an alloy of aluminum, chromium, and nickel for providing bonding.

Deposition by thermal spraying is a technique that is expensive and requires relative spray angles to be maintained between the axis of the torch and the surfaces of the parts to be coated so that the impact of the sprayed particles is as orthogonal as possible relative to the surface for coating in order to obtain satisfactory quality and adhesion for the deposit.

Furthermore, when depositing such a coating, the propulsive or plasma-generating gases used for spraying must be capable of being removed easily but without blowing away the projected powder by creating turbulence.

OBJECTS AND SUMMARY OF THE INVENTION

An object of the present invention is to overcome those drawbacks by providing a solution that makes it possible to avoid forming the rim(s) by casting, thereby simplifying the tooling used for casting and avoiding the need to reject some of the parts that are obtained by the casting step.

This object of the invention is achieved by a method comprising the following steps:

a) providing a blade presenting at least one base for a rim at its free end;

b) providing at least one source of powder material and a spray nozzle connected to said source and suitable for moving relative to said blade;

c) providing a laser source connected to an optical head suitable for moving relative to said blade in order to focus the laser beam on a point of the surface of said base for a rim;

d) aiming the optical head and the nozzle on a common point of the surface of the top of the base for a rim;

e) activating the laser source and the powder material source so as to form a localized melt in the vicinity of said point, into which the powder material is injected, thereby forming a localized region of extra thickness;

f) aiming the optical head and the nozzle on another point of the surface of the top of the base adjacent to said localized region of extra thickness, and returning to step e) until a layer has been formed over substantially the entire width of the top of the base; and g) building at least a portion of said rim by depositing successive layers on the top of the base, each layer being the result of performing steps d) to f).

It can be understood from the above that instead of making the rim by casting, and instead of optionally depositing an abrasive coating on the surface of the resulting rim by thermal spraying, the invention proposes building up the height of the projecting portion forming said rim completely or at least in part, by making use of laser spraying.

Laser spraying consists in using a laser beam that can be aimed very accurately to create a highly localized melt on the part, and in injecting into said melt a powder (made of metal and/or ceramic) that can be abrasive. Thus, unlike thermal spraying, there is no need to heat the powder, and its path can thus be separate from that of the laser beam.

The laser beam propagates from its source to the target over an optical path. The optical path is built up either by a succession of mirrors that receive the beam and that reflect it in a different direction, together with lenses that cause the beam to converge or diverge or remain parallel, or else the path is provided by an optical fiber.

Either way, the optical path is terminated by a system of lenses referred to as an "optical head" causing the beam to converge on a point at a certain distance away therefrom. The laser spray device provides great flexibility in use providing there is no obstacle between the optical head and the point of impact where the laser is aimed on the part. With thermal spraying, it is necessary for the powder to arrive so that it impacts in a direction normal to the surface that is to be coated. With the method proposed in the present invention, in completely different manner, laser spraying only requires a melt to be filled, and the powder can be delivered over a wide variety of trajectories relative to the surface receiving the powder.

The metal powder is delivered by a powder dispenser. It travels along a tube having an end fitted with a nozzle that directs the powder towards the melt created by the laser beam. The tube may be flexible and guided by a rigid support arm or by a robot or by any other positioning device, or it may itself be rigid and pointed towards the zone of the part that is to be coated.

Other advantages of the laser spraying method can be mentioned.

With thermal spraying, the nozzle transmitting the hot gas must be close to the surface that is to be coated, whereas with laser spraying, the optical head can be relatively distant from said surface. With thermal spraying, the powder must be heated since it must follow the same trajectory as the hot gas, but this does not apply to laser spraying in which the trajectory of the powder can be separate from that of the laser beam.

In addition, with thermal spraying, a continuous coating method is provided, whereas with laser spraying, given the flexibility with which a laser beam can be controlled, it is possible to perform spraying either continuously or sequentially, merely by switching the laser beam on and off.

Furthermore, it will be understood that the solution in accordance with the present invention avoids any need to machine the rim obtained by casting, where said tip is in a location that is relatively difficult for it to be machined. By means of the method of the present invention, the rim is built up layer by layer, where appropriate simultaneously with a coating of a material that is sufficiently abrasive.

In this respect, it should be observed that the method can be used for building up the rim over its full height (in which case the rim base is merely a location on the free end of the blade), or else the method can be used solely for building up the rim over that portion of its height that forms its end or its tip (in which case the rim base is a rim of small height, forming a stump on the free end of the blade, and that is obtained by casting, possibly followed by rectification by machining).

In step e), the laser source and the source of powder material are activated successively or almost simultaneously so that the localized melt is present at the location where the laser beam is directed when the powder reaching that location impacts against said surface.

In addition, because of the great flexibility with which this laser spraying technique can be used, said rim(s) can be made of a material that is selected to be different from that of the blade, either completely or in part.

Furthermore, it will be understood that there is no need to deposit any coating by thermal spraying in order to ensure that the rims are not damaged by coming into contact with the stator and the abradable ring, if any.

Preferably, steps d) to f) are performed until the entire surface of the top of the base for the rim has been coated in a layer, and during step g), the rim is built up by depositing successive layers over the entire surface of the top of the base for the rim, each layer being the result of performing steps d) to f). Provision can be made to deposit successive layers that are increasingly narrow in the direction that extends transversely to the suction-side and/or pressure-side walls of the blade.

It is preferable to build up the rim stratum by stratum, initially making a new layer over the entire surface of the top of the base for the rim, prior to continuing to build up the rim radially outwards.

Nevertheless, it is possible to devise other methods of building, including building a front sector of the rim layer by layer and then continuing by building another sector of the rim, or indeed using a plurality of optical heads and a plurality of nozzles so as to build up a plurality of rim sectors simultaneously.

Preferably, during step f), the surface of the top of the base for the rim is followed in a direction extending transversely to the pressure-side and/or suction-side wall prior to shifting through an offset in the longitudinal direction that extends between the leading edge and the trailing edge.

Under such circumstances, each layer is built up line by line moving the point of aim of the optical head and of the nozzle along the line (or by moving the end of the blade relative to the laser spraying equipment) parallel to the direction extending transversely to the pressure-side and/or suction-side wall prior to shifting in the longitudinal direction of the end of the blade and beginning a new line, until the entire layer has been made.

Naturally, other trajectories could be devised for following in order to build up each layer, for example by making one after another beads of material that are offset slightly from one another in the transverse direction.

In another preferred disposition, during step f), the laser source and the source of powder material remain activated.

In this way, it is possible to build up the rim continuously by forming successive islands of material, either for the purpose of making the entire rim, or else in sequences each corresponding to making a portion thereof (e.g. one complete layer of the rim). Alternatively, or in combination with these various options, it is also possible, in particular in zones that are the most difficult to reach and/or of the smallest dimensions, to make a deposit material point by point by deactivating the laser source and the source of material during step f).

The invention also provides a rotor blade for a gas turbine engine including at least one rim situated at its free end, with the rim being obtained by the method in accordance with the present invention as described above.

As can be seen from the above description of the method in accordance with the invention, it should be understood that the rim is fabricated by the method either entirely (over its full height) or else in part only, i.e. in its end portion constituting its top.

Under such circumstances, the radially-inner portion of the rim is formed by a base previously made by being cast with the remainder of the blade.

In particular, the blade forms a portion of the rotor of a low-pressure or high-pressure compressor or of a low-pressure or high-pressure turbine of a turbomachine.

The present invention also provides a turbomachine including a rotor blade of the above-specified type.

BRIEF DESCRIPTION OF THE DRAWINGS

Other advantages and characteristics of the invention appear on reading the following description given by way of example and made with reference to the accompanying drawings, in which.

MORE DETAILED DESCRIPTION

Figure 1:
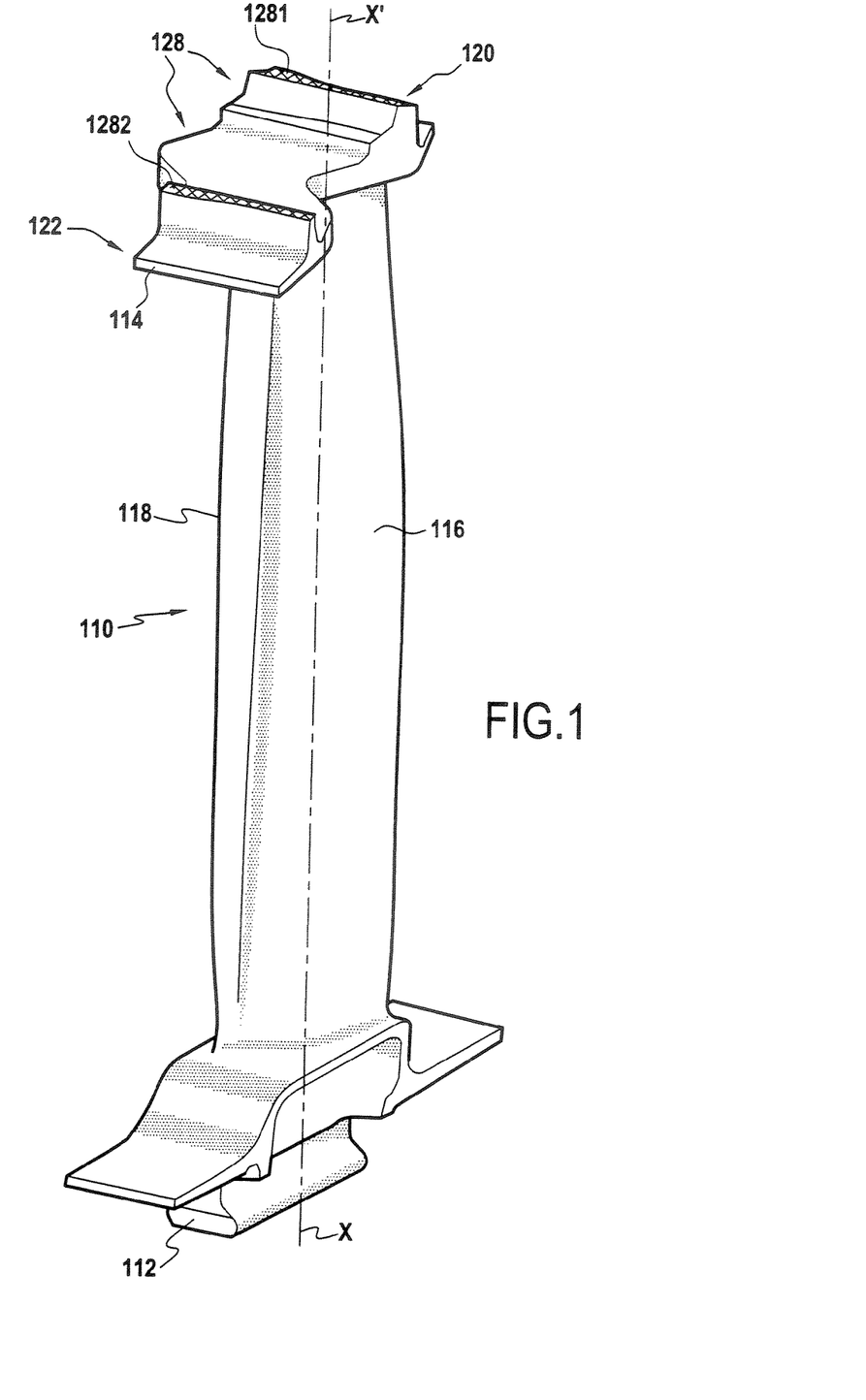
FIG. 1 is a perspective view of a blade of the first type.

FIG. 1 shows a first type of turbomachine blade 110 having a blade root 112 at its inner end and a free end 114 forming a head at its peripherally outer end. The blade 110 extends in a radial direction along a blade axis X-X' that encourages axial flow, the axis X-X' being perpendicular to the axis of the rotor on which the blade 110 is mounted. Lengthwise, the blade 110 presents an airfoil having a pressure-side wall 116 and a suction-side wall 118.

At its free end 114, the blade 110 presents two wipers or rims 128, respectively referenced 1281 and 1282, that extend transversely relative to the pressure-side and suction-side walls 116 and 118 in a direction that is substantially rectilinear and that projects radially from the free end 114. The rims 1281 and 1282 may be identical in height all along both of the rims, or they may present varying height, in particular height that is greater beside the suction-side wall so as to form a "sawtooth" effect from one blade to the next. Under all circumstances, the variation in height remains small and does not exceed 0.2 mm, for example, in order to avoid wear of the rim 128.

Thus, this blade 110 of the first type has a plurality of rims 128 (specifically two rims 1281 and 1282) extending between the leading edge 120 and the trailing edge 122 and parallel to each other, forming wipers that extend in the longitudinal direction and that are spaced apart from each other.

Figure 2:
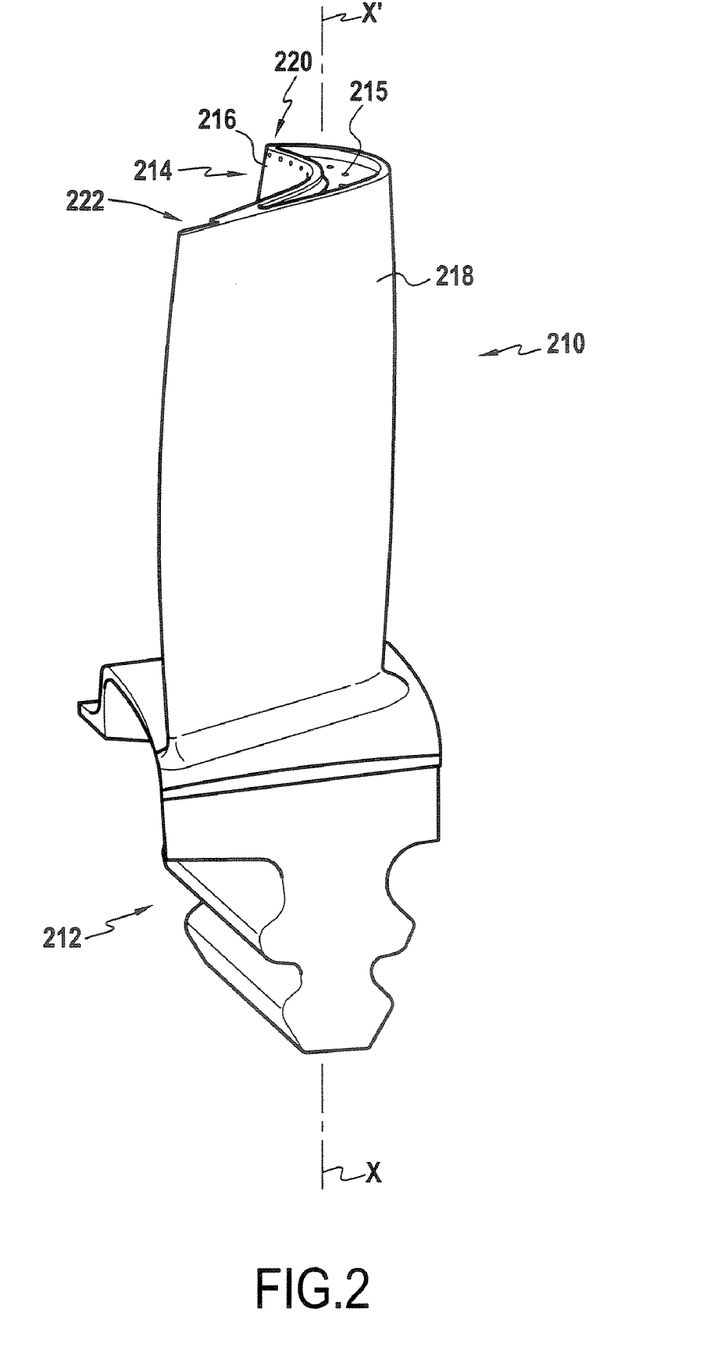
FIG. 2 is a perspective view of the blade of the second type.

FIG. 2 is a perspective view showing an example of a rotor blade 210 of the second type, in particular a conventional hollow blade for a gas turbine. Cooling air (not shown) flows inside the blade from the bottom of the root 212 of the blade in a radial direction (vertical) towards the free end 214 of the blade (at the top of FIG. 2), and then said cooling air escapes through an outlet to exhaust into the main gas flow.

In particular, as can be seen from FIGS. 5 to 10, the cooling air flows along an internal cooling passage 224 situated inside the blade 210 and that terminates at the free end 214 of the blade in through holes 215.

The body of the blade has an airfoil shape so as to define a pressure-side wall 216 (to the left in all of the figures) and a suction-side wall 218 (to the right in all of the figures). The pressure-side wall 216 presents a generally concave shape and is the first face to encounter the hot gas flow, i.e. it is on the gas pressure side, while the suction-side shape 218 is convex and meets the hot gas flow subsequently, i.e. it is on the gas suction side.

The pressure-side and suction-side walls 216 and 218 meet at the location of a leading edge 220 and at the location of a trailing edge 222 that extend radially between the free end 214 of the blade and the top of the blade root 212.

Figure 3:
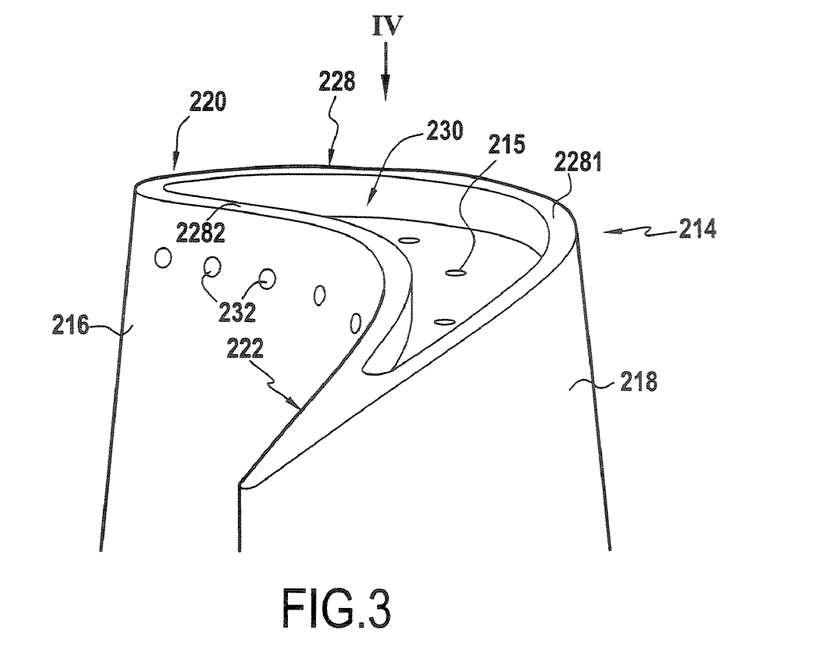
FIG. 3 is a perspective view on a larger scale showing the free end of the FIG. 2 blade.
Figure 4:
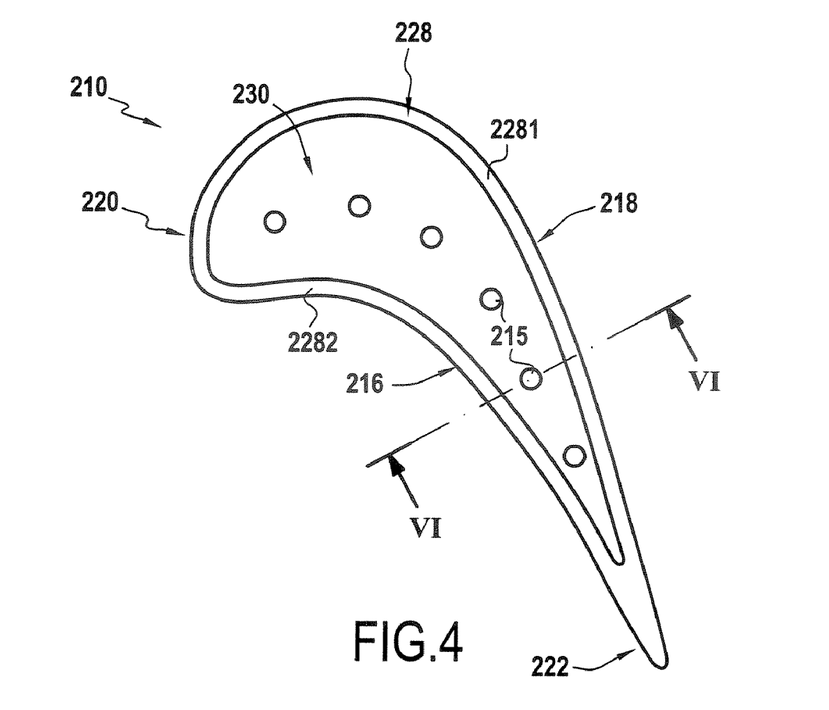
FIG. 4 is a simplified plan view looking along arrow IV of FIG. 3, showing the free end of the blade.
Figure 5:
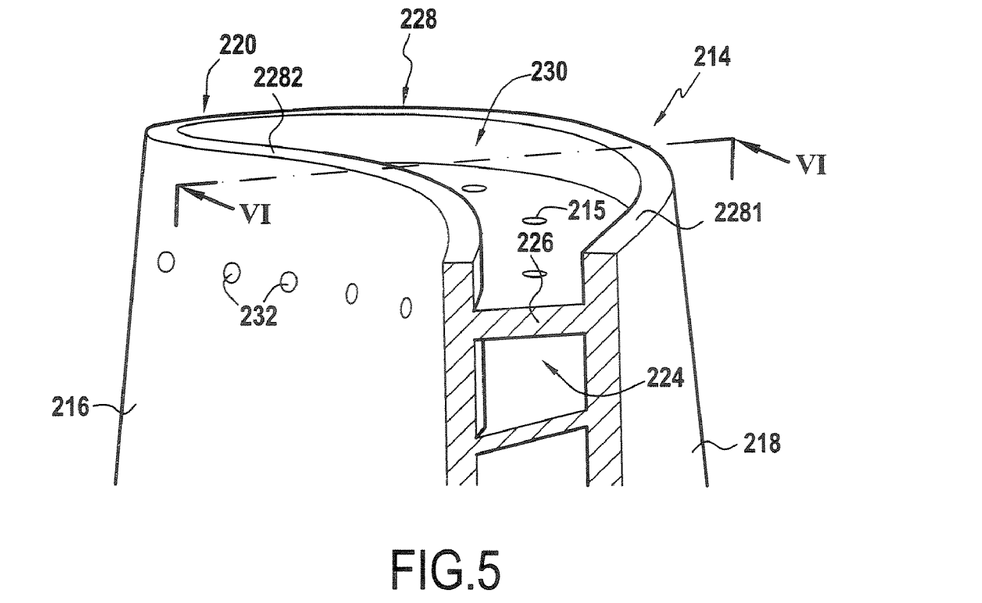
FIG. 5 is a view analogous to that of FIG. 3, with the trailing edge of the blade shown removed in longitudinal section.
Figure 6:
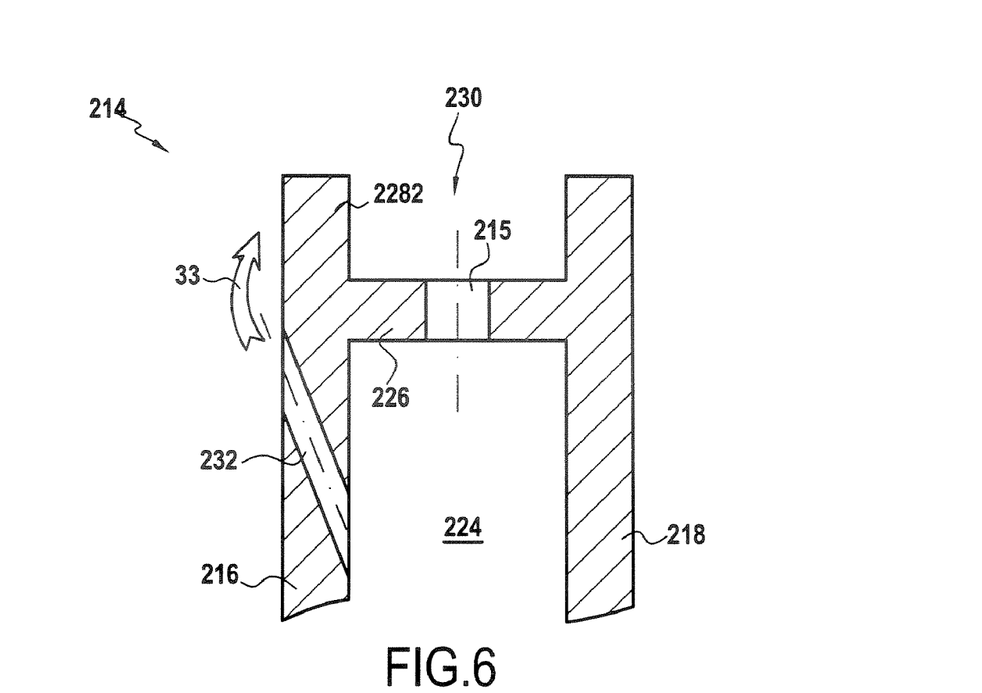
FIG. 6 is a longitudinal section view on plane VI-VI of FIG. 5 or FIG. 4.

As can be seen in the enlarged views of FIGS. 3, 5, and 6, at the free end 214 of the blade, the internal cooling passage 224 is defined by an end wall 226 that extends over the entire free end 214 of the blade, between the pressure-side wall 216 and the suction-side wall 218, from the leading edge 220 to the trailing edge 222.

At the free end 214 of the blade, the pressure-side and suction-side walls 216 and 218 form the rim 228 of a "bathtub" or cavity 230 that is open facing away from the internal cooling passage 224, i.e. radially outwards (towards the top in all of the figures).

The through holes 215 pass through the entire thickness of the end wall 226 and put the open cavity 230 into communication with the internal cooling passage 224.

The rim 228 is made up of a suction-side rim 2281 and a pressure-side rim 2282 respectively extending the suction-side wall 218 and the pressure-side wall 216 radially outwards (towards the top in all of the figures) beyond the end wall 226 as far as the free end 214 of the blade.

The rim 228 thus forms a thin wall along the outline of the blade serving to protect the free end 214 of the blade 210, and in particular to protect its end wall 226, from coming into contact with the facing annular surface of the stator, e.g. of the turbine casing.

As can be seen more precisely from the section view in FIG. 6, inclined cooling channels 232 pass through the pressure-side wall 216 so as to connect the internal cooling passage 224 to the outside face of the pressure-side wall 216, beneath the outside face of the pressure-side rim 2282.

These cooling channels 232 are inclined so as to open out towards the top of the pressure-side rim 2282 so as to cool said top as much as possible (arrow 33 in FIG. 6), all along the pressure-side wall 16, or more precisely all along the outside face of the pressure-side rim 2282.

Figure 7:
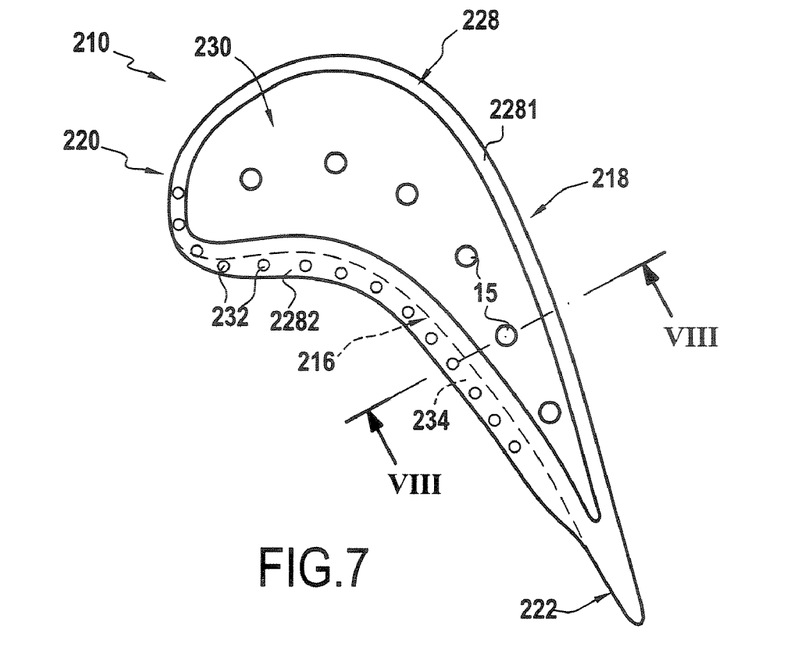
FIG. 7 is a view analogous to that of FIG. 4, showing a variant embodiment.
Figure 8:
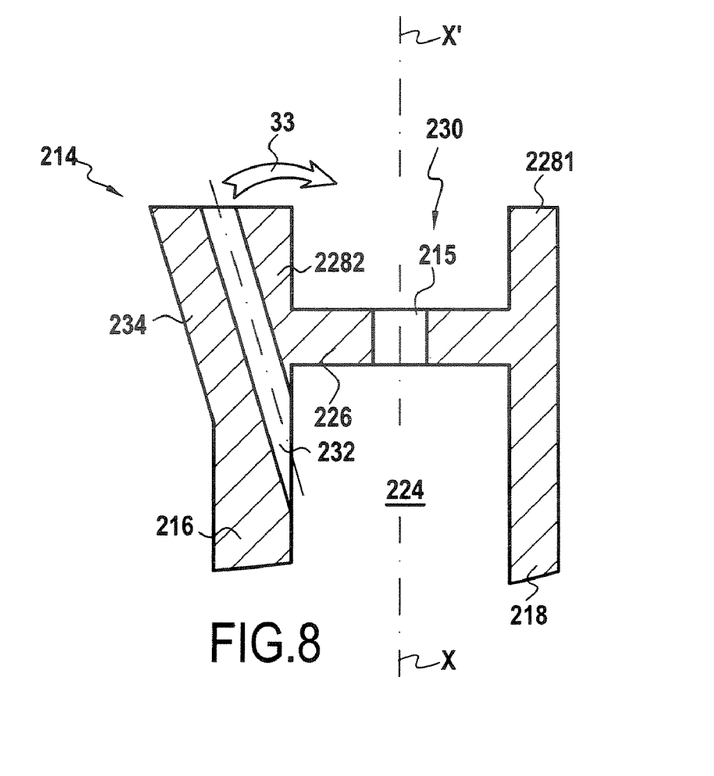
FIG. 8 is a view analogous to that of FIG. 6 for the variant embodiment of FIG. 7.

In the variant of FIGS. 7 and 8, the pressure-side wall 216 presents a projecting end portion 234 whose outside face is inclined relative to the outside face of the pressure-side wall 216, the cooling channels 235 being disposed through said end portion 34. In this variant of FIGS. 7 and 8, the pressure-side rim 2282 projects transversely outwards at the location of the end portion 234 of the pressure-side wall 216 so that the outside face of the pressure-side rim 2282 is inclined and forms an acute angle with the radial direction (vertical in FIG. 8) or the axis X-X' of the outside face of the remainder of the pressure-side wall 216, this angle preferably lying in the range 0 to 45°, and in particular in the range 10° to 35°, advantageously in the range 15° to 30°, and preferably about 30°.

Figure 9:
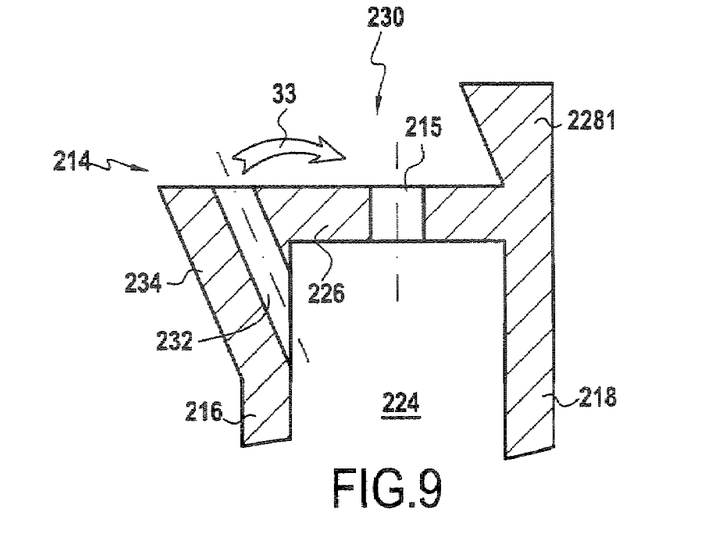
FIG. 9 is a view analogous to that of FIG. 8 for a blade constituting another variant embodiment.

Reference is now made to FIG. 9 which shows another variant in which the pressure-side wall 216 does not have a pressure-side rim 2282. In this variant, the top of the end portion 234 is orthogonal to the pressure-side and suction-side walls 216 and 218, extending in a direction parallel to the top of the suction-side rim 2281, extending the top surface of the end wall 226.

In addition, the suction-side rim 2281 presents an inside face facing towards the pressure-side wall 216 and facing the open cavity 230 that extends in inclined manner so as to form an acute angle, i.e. an angle of less than 90°, relative to the outside face of the end wall 226. In this variant, the suction-side rim 2281 is thus wider at its top.

It should be observed that the various variants shown and described above can be combined with one another.

Figure 10:
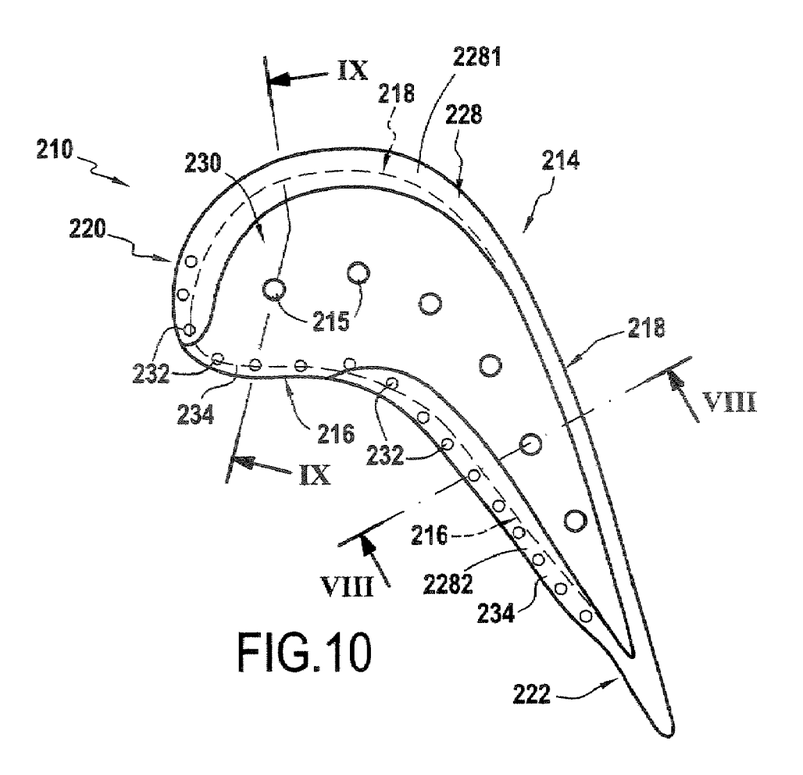
FIG. 10 is a simplified end view similar to that of FIG. 4 for a blade combining various shapes of rim for the free end of the blade.

Thus, for example, FIG. 10 shows the free end 214 of a blade 210 of the second type that presents a plurality of rim configurations between its leading edge 220 and its trailing edge 222:

at the front of the blade, downstream from the leading edge 220, there can be seen the shape of FIG. 9 with an end portion 234 projecting transversely beside the pressure-side wall 216, having no pressure-side rim and accompanied by a suction-side rim 2281 having an enlarged top; and at the rear of the blade, upstream from the trailing edge 222, there can be seen the disposition of FIG. 8 with, beside the pressure-side wall 216, an end portion 234 projecting transversely that includes the pressure-side rim 2282 with an enlarged top, and beside the suction-side wall 218, a suction-side rim 2281 that presents a top that is not enlarged.

Thus, this blade 210 of the second type (having a "bathtub") is hollow and includes an internal cooling passage 224, an open cavity 230 situated at the free end 214 of the blade 210, and an end wall 226 extending over the entire end 214 of the blade, separating said internal cooling passage 224 from the open cavity 230, said end wall 226 presenting, at the end of the casting step, a rim base on which the rim 2281 is built up layer by layer by laser spraying.

With blades of the first type and of the second type, and when using the method of the present invention for making a rim, one or both of the following dispositions is/are preferably adopted:

the rim 128 or 228 extends between the leading edge (120 or 220) and the trailing edge (122 or 222); and the rim 128 or 228 extends along at least the suction-side wall (118 or 218).

By way of example, an implementation of the method in accordance with the present invention is described below with reference to FIGS. 11 to 13 constituting fragmentary section views for a pressure-side rim 2282 of the kind shown in FIG. 6.

Figure 12:
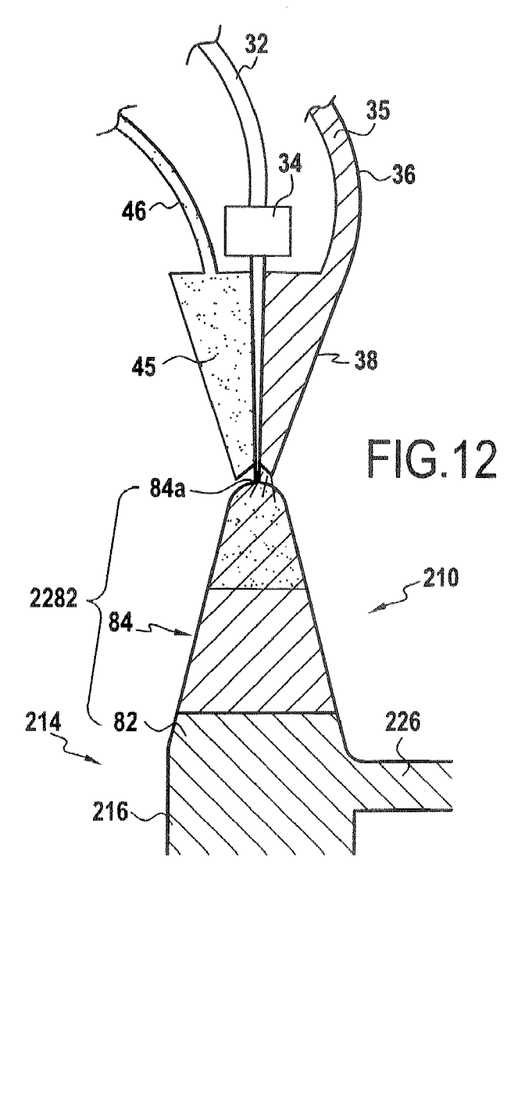

As can be seen in FIG. 12, and relative to the pressure-side and suction-side walls 216 and 218, the outer profile of the rim 2282 presents a shape in cross-section that is substantially in the form of an upside-down letter V or U with the limbs of the U-shape inclined and tapering towards the top of the rim 2282.

Figure 13:
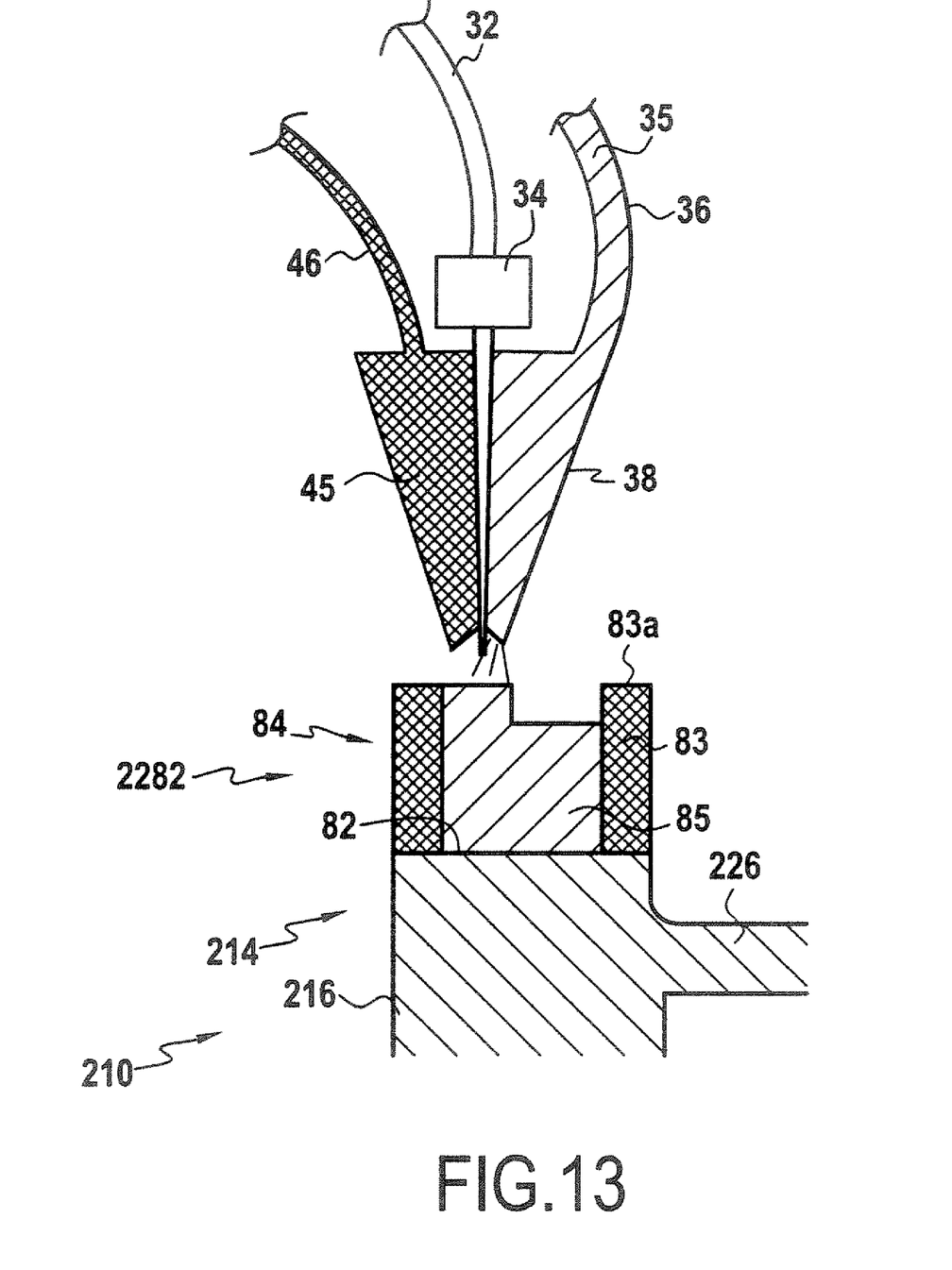
FIG. 13 is a view analogous to that of FIG. 11, for a variant implementation of the method in accordance with the present invention.

Alternatively, and as can be seen in FIG. 13, the rim 2282 is provided with a profile of cross-section in the shape of an upside-down letter U, in which the limbs of the U-shape are parallel to each other.

Nevertheless, as explained above, in prior art techniques, the rim 2282 is machined directly in the blade 210 after it has been cast with the shape mentioned above. Thereafter, where appropriate, said rim 2282 can be coated by a deposit made by thermal spraying so as to reinforce its abrasive-resistance properties.

In contrast, in the present invention, the free end 214 of the blade 210 as obtained after casting is machined solely for the purpose of providing a base 82 that projects from the top surface of the end wall 226 at the free end 214 of the blade 210 over no more than a few millimeters, for the purpose of initiating the beginning of the projecting shape of the rim 2282.

Thereafter, to fabricate the remainder of the rim 2282, i.e. its end or tip 14, equipment (not shown in full) is used that is suitable for performing laser spraying.

This equipment comprises the following portions:

a system enabling the blade 210 to be held and moved, in particular in rotation and in translation;

a laser ($CO_2$ or YAG) source 30 having a system for transmitting the laser beam 32 by refection on mirrors or using an optical fiber until it reaches an optical head 34;

the optical head 34 presenting a focal length that corresponds to the distance between said head and the surface to be coated, said optical head 34 being secured to a positioning device capable of placing it in such a manner that the focal point of the laser beam can scan over all points of a right section of the surface to be coated, or of the volume to be built up; and at least one source of a first powder material 35 comprising powder dispenser and metering means together with a feed tube 36 for delivering said powder to a nozzle 38.

In the example shown, there is also provided a source of a second powder material 45 that is connected to the nozzle 38 via a corresponding feed pipe 46.

It will thus be understood that, during step b), a first source of a first powder material source 35 is preferably provided as well as a second source of a second powder material 45, said first source and said second source being connected to the spray nozzle 38.

Figure 11:
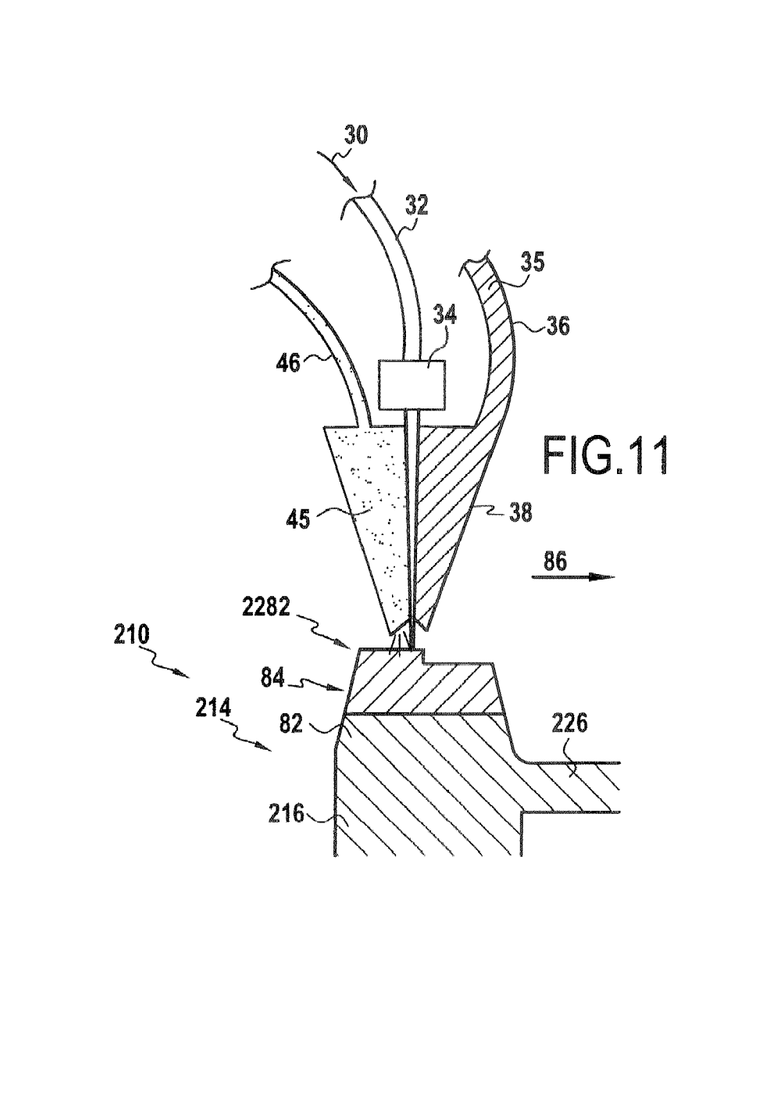
FIGS. 11 and 12 are fragmentary diagrammatic axial section views on a larger scale showing the free end of a blade, showing how the cross-section and the profile of the rim change while implementing the method of manufacture in accordance with the present invention.

In the example shown diagrammatically in FIGS. 11 to 13, the optical head 34 and the nozzle 38 form a common assembly, i.e. the optical head 34 and the spray nozzle 38 are secured to each other in a common spray assembly of position that can be adjusted relative to the blade 210.

Nevertheless, the nozzle 38 could equally well be situated separately beside the laser beam, being supported by its own positioning device so as to enable it to follow the movements of the focus point of the laser beam.

With reference to FIGS. 11 to 13, it should be understood that the tip 84 of the rim 2282 is built up layer by layer all the way to the free end of the tip 84.

For each layer that is to be formed, the material can be deposited point by point in a variety of configurations.

In particular, as shown in FIG. 11, it is possible to make provision for making side-by-side runs of material extending crosswise relative to the suction-side and pressure-side walls 218 and 216, by moving the optical head 34 and the blade 210 relative to each other (arrow 86 in FIG. 11) for each run. Thereafter, the optical head 34 and the blade 210 are moved relative to each other in the longitudinal direction so as to begin another run, and so on until the entire new layer of material has been formed.

Thereafter the steps are repeated for a new layer of material that is narrower, and so on to the free end 84a of the tip 84 (FIG. 12).

In the example shown in FIGS. 11 and 12, the initial layers are made solely using the first material 35, while the final layers of the tip 84 come from a mixture of the first material 35 and of the second material 45, which second material may be constituted by abrasive particles.

Under such circumstances, during step e), the first source (35) and the second source (45) of powder material are operated simultaneously so that the nozzle (38) sprays a mixture of the first and second powder materials 35 and 45.

Alternatively, provision can be made for the composition of the material constituting the tip 84 to vary progressively, with more and more of the second material 45 being mixed in with the first material 35 as the building of the tip approaches the free end 84a of the rim 2282.

Under such circumstances, it will be understood that in general the rim 2282 is constituted by a base (82) surmounted by a tip (84) (of upside-down V-shape or U-shape) having a composition that varies going away from its free end 84a.

It should be observed that the present invention also covers the circumstance in which no rim base 82 is provided initially by the step of casting the blade 210, with the entire height of the rim being built up in the manner described above, the base of the rim then being no more than a radially-outer portion of the surface of the free end 214 (situation not shown), and with a blade of the second type this corresponds to a portion of the outside surface of the end wall 226.

Also, FIG. 13 shows another possible method of building up the rim 2282 in the present invention.

In this example, the second powder material 45 is initially melted to form two annular beads 83a along the two longitudinal edges of the top of the base 82 of the rim (or of the previously-made layer), and then it is filled in by delivering the first powder material 35 into the localized melt generated by the laser beam in the recess-shaped space lying between the two annular beads 83a, thus building a central zone for constituting the final core 85 of the rim 2282.

In this way, the annular beads 83a made layer by layer with the second powder material 45 together form a coating 83, while the central zones filled with the first powder material 35 form the core 85 of the rim 2282.

Preferably, steps are taken to ensure that the first powder material 35 is identical to the material constituting the blade and/or that the second powder material 45 is harder than the first material 35.

In this way, a coating 83 is obtained that is harder than the core 85 of the rim 2282.

By way of example, it is possible to have a blade 210 of titanium alloy and a core for the rim 2282 that is likewise of titanium alloy, but with a coating 83 of a material that is hard and abrasive, or indeed it is possible to have a rim that is made entirely of a material that is hard and abrasive. For the material that is hard and abrasive, it is appropriate to select a material from metals that withstand oxidation when hot, such as an alloy of the MCrAlY type (where M is a metal selected from nickel, cobalt, iron, and mixtures of these metals).

It will thus be understood that in the method of FIG. 13, each layer (except for the last) forming the rim 2282 is the result of the following two sub-steps:
forming on the surface of the rim base 82 two annular beads 83a using the second powder material 45 (in a variant it is possible to use a mixture of said second powder material 45 with the said first powder material 35) as a result of the optical head 34 and the nozzle 38 being offset a little in the longitudinal direction during the preceding step between the leading edge 220 and the trailing edge 222 relative to the previously-obtained localized region of extra thickness; and filling the zone 85 situated between the two beads 83a with the first powder material 35.

Each annular bead 83a is thus made by making a continuous deposit by laser spraying while moving in the longitudinal direction of the blade 210, said longitudinal direction extending between the leading edge 220 and the trailing edge 222.

The depression defined between the two beads 83a can be filled with the first powder material 35 in various ways, including:
either by moving longitudinally, building up little by little another bead parallel to the beads 83a made of the second powder material 45, and then shifting transversely to form another annular bead;
or else by shifting transversely (in the direction of arrow 86 in FIG. 11) so as to fill the zone between the two beads 83a along one transverse line, and then performing a longitudinal offset prior to forming another transverse line in the opposite direction so as to fill the space between the two beads 83a by forming successive runs of material.

The last layer of the rim 2282 is formed using the same material as the beads 83a, in particular the second material 45, that is harder than the first material 35.

In the example shown in FIG. 13, the rim 2282 comprises a base 82 surmounted by a portion or tip 84 of upside-down U-shape made up of a core 85 made of the first material 35 and a coating 83 covering the entire core 85 and made using the second material 45 that is harder than that of the core 85.

Furthermore, using the same equipment as that shown in FIGS. 11 to 13, it is possible to envisage building up the tip 14 of the rim 2282 in accordance with the invention while progressively modifying the composition of the material going from the coating-forming outside surface 83 towards the core 85 of the rim 2282 by progressively varying the fractions of the first and second powder materials 35 and 45.

It will be understood that the method proposed by the present invention serves firstly to avoid performing machining that is difficult and secondly, when using two different materials for the core and the surface, it serves to make a coating by a thermal spraying method that could otherwise not be made properly in certain geometrical circumstances.

Furthermore, because of the simplicity with which materials can be deposited by laser spraying, it is possible to envisage making abrasive coatings in situations where that was not possible in the past.

Amongst the materials that can be used, it is preferable to use for the core 85 a metal powder material having the same composition as the blade 210, namely a titanium alloy or a nickel-based alloy, and for the coating 83 to use more preferably a material that is hard and abrasive. In particular, a selection can be made amongst metals that withstand oxidation when hot such as an alloy of the MCrAlY type (where M is a metal selected from nickel, cobalt, iron, and mixtures of these metals) or an alloy based on cobalt, chromium, and tungsten, such as Stellite (registered trademark). As the second material, it is also possible to use abrasive particles such as ceramic particles, e.g. titanium dioxide ($TiO_2$), alumina ($AlO_2$), or zirconia ($ZrO_2$), or a mixture constituted by any one of them or indeed SiC coated in AlN or in $Al_2O_3$.

It should be observed that the cooling channels 232 connecting the internal cooling passage 224 and the outside face of the pressure-side wall 216, said cooling channels 232 being inclined relative to the pressure-side wall 216, are formed in the rim 2282 itself, in the pressure-side wall 216, and in the optional projecting portion 234, and thus after they have been built up by laser spraying.

It should be observed that the above-described building technique can be applied not only to the rims 128, 228, but also to all or part of the projecting portion 234 of FIG. 8.

What is claimed is:

1. A method of making at least one rim situated at the free end of a rotor blade for a gas turbine engine, the method comprising the following steps:
   a) providing a blade presenting at least one base for a rim at its free end;
   b) providing a spray nozzle suitable for moving relative to said blade, and a first source of a first powder material, and a second source of a second powder material, said first source and said second source being connected to the spray nozzle;
   c) providing a laser source connected to an optical head suitable for moving relative to said blade in order to focus the laser beam on a point of the surface of said base for a rim;
   d) aiming the optical head and the nozzle on a common point of the surface of the top of the base for the rim;
   e) activating the laser source and the sources of powder material so as to form a localized melt in the vicinity of said point, into which the powder material is injected, thereby forming a localized region of extra thickness;
   f) aiming the optical head and the nozzle on another point of the surface of the top of the base adjacent to said localized region of extra thickness and returning to step e) until a layer has been formed over substantially the entire width of the top of the base; and
   g) building at least a portion of said rim by depositing successive layers on the top of the base, each layer resulting from performing steps d) to f) and the following sub-steps:
      g1) forming two annular beads on the surface of the base for the rim, using the second powder material or a mixture of said second material and said first material by causing the optical head and the nozzle to be offset during step f) in a longitudinal direction extending between the leading edge and the trailing edge relative to the previously-obtained localized region of extra thickness; and
      g2) filling a zone situated between the two annular beads with the first powder material.

2. A method according to claim 1, wherein steps d) to f) are performed so long as the top of the base for the rim has not been coated in a layer, and
   wherein, during step g), the rim is built up by depositing successive layers over the entire surface of the top of the base of the rim, each layer being the result of performing steps d) to f).

3. A method according to claim 1, wherein, during step f), the surface of the top of the base for the rim is followed in a direction extending transversely to the pressure-side wall and/or the suction-side wall prior to offsetting in the longitudinal direction that extends between the leading edge and the trailing edge.

4. A method according to claim 1, wherein, during step f), the laser source and the sources of powder material remain activated.

5. A method according to claim 4, wherein the second material is harder than the first material.

6. A method according to claim 1, wherein the first material is identical to the material constituting the blade.

7. A method according to claim 1, wherein, during step e), both the first source and the second source of powder material are activated simultaneously so that the nozzle projects a mixture of the powder materials.

8. A method according to claim 1, wherein the optical head and the spray nozzle are secured to each other in a common projection assembly of position that is adjustable relative to the blade.

9. A method according to claim 1, wherein the base for the rim is placed radially extending at least the pressure-side wall.

10. A rotor blade for a gas turbine engine, the blade including at least one rim situated at a free end of said blade, wherein said rim comprises a base that ends at a top surface, said rim further comprising a core mounted on the top surface of said base and made of a first material, said rim further comprising a coating covering the entire core so that said core is not exposed and wherein said coating is made of a second material that is harder than the first material of the core.

11. A blade according to claim 10, wherein said coating has a composition that varies going away from free end.

12. A blade according to claim 10, wherein said blade has a leading edge and a trailing edge and wherein said rim extends between the leading edge and the trailing edge.

13. A blade according to claim 10, wherein said rim extends along at least a suction-side wall of said blade.

14. A blade according to claim 10, wherein said blade has a leading edge and a trailing edge and includes a plurality of rims extending between the leading edge and the trailing edge, and extending parallel to one another.

15. A blade according to claim 10, wherein the blade is hollow and includes an internal cooling passage, an open cavity situated at the free end of the blade, and an end wall extending over the entire end of the blade, separating said internal cooling passage from the open cavity, said end wall presenting said base of said rim.

16. A blade according to claim 15, further including cooling channels connecting said internal cooling passage and the outside face of the pressure-side wall, said cooling channels being inclined relative to the pressure-side wall.

17. A turbomachine including a rotor blade according to claim 10.

18. A blade according to claim 10, wherein said coating has a multi-layer composition.

19. A blade according to claim 18, wherein said base and said core are made of a same material, and said coating is made of a different material.

20. A blade according to claim 19, wherein said base and said core are made of a titanium alloy, and wherein said coating is made of an MCrAlY alloy.

* * * * *